UNITED STATES PATENT OFFICE.

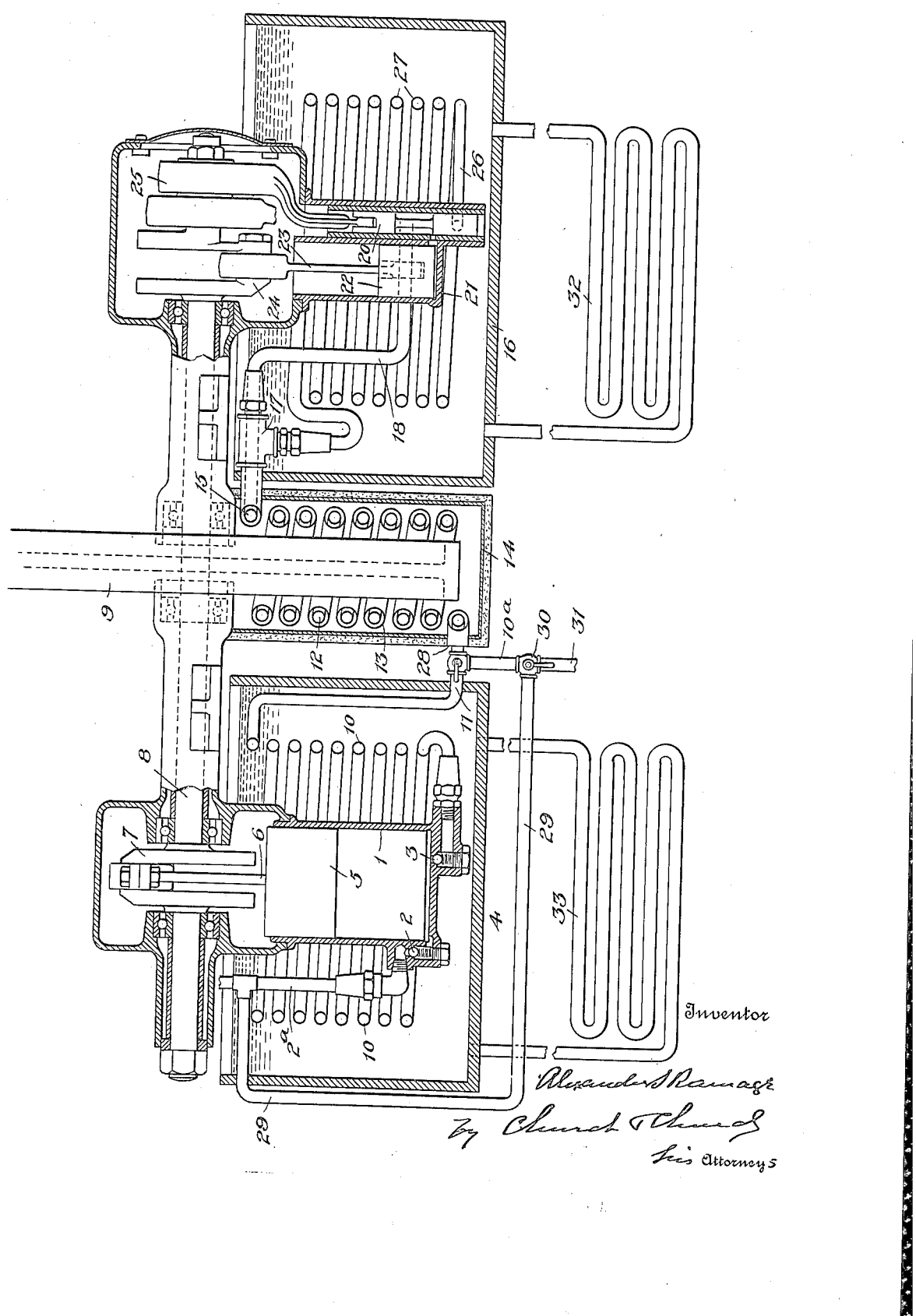

ALEXANDER S. RAMAGE, OF DETROIT, MICHIGAN.

APPARATUS FOR EXCHANGING HEAT.

1,302,431. Specification of Letters Patent. Patented Apr. 29, 1919.

Application filed December 3, 1915, Serial No. 64,914. Renewed March 26, 1919. Serial No. 285,386.

*To all whom it may concern:*

Be it known that I, ALEXANDER S. RAMAGE, a subject of the King of Great Britain, residing at Detroit, in the county of Wayne and State of Michigan, have invented certain new and useful Improvements in Apparatus for Exchanging Heat; and I do hereby declare the following to be a full, clear, and exact description of the same, reference being had to the accompanying drawings, forming part of this specification.

This invention relates generically to the transfer of heat from one substance to another.

More particularly the improvements of the invention lie in a novel method for heating air atmospheres in winter and refrigerating them in summer, and an important feature of this method is in connection with the production of the temperature changing fluid which is utilized to heat or cool the temperature of the air atmosphere, as the case may be. This feature consists in effecting a heat exchange between the temperature changing fluid and a charge of atmospheric air or other gas undergoing volume change, as compression in a compression cylinder, or expansion in an expansion cylinder, so that, in the first case, the losses by radiation from the cylinder are utilized to raise the temperature of the fluid and in the second case the heat units radiated from the fluid and absorbed by the expanding charge serve to reduce the temperature of the fluid.

In the heating of an air atmosphere, according to the present invention, a charge of atmospheric air or other gas is compressed in a suitable compression cylinder. Surrounding the compression cylinder is a brine tank, the brine flowing around the walls of the cylinder. As a consequence the heat units radiated from the cylinder at the time of compression of the charge are absorbed by the surrounding brine, thus serving to increase its temperature. Further compressions in the cylinder will raise the temperature of the brine by successive degrees until it has attained a temperature sufficiently high for the production of the desired heating effect upon the air atmosphere to be heated. The hot brine may be circulated through coils in the air atmosphere and returned to the tank for reheating. It will be noted that a particularly important advantage derived from this process is that the heating fluid itself absorbs the heat units radiating at the time of compression and there being a very small waste of heat, the results obtained are practically adiabatic. Furthermore, the difference in temperature between the surrounding brine or other fluid and the outside air is not nearly so great as the difference in temperature between the charge in the cylinder and the outside air, and as a result the principal exchange of heat units is between the surrounding brine and the charge in the cylinder. This renders unnecessary the employment of a vacuum insulation for the cylinder or other high degree of insulation, in order to conserve and utilize the heat of compression.

In the case of refrigeration, a charge of atmospheric air or other gas is compressed in a cylinder, the compressed charge is then cooled, conveniently by leading it through a cooling coil and then through a heat-insulated, heat exchanging or regenerative coil. The cold compressed air is fed into an expander wherein charges of it are expanded, thereby further reducing the temperature. Surrounding the expander is a tank containing brine or other fluid so that a heat exchange is effected between each charge undergoing expansion and the surrounding brine. The difference in temperature between the expanded charge and the brine causes a radiation of heat units from the brine to the expanded charge, thereby reducing the temperature of the brine. Further expansions lower the temperature of the brine by successive degrees until it has attained the desired degree of cold when it can be circulated through the atmosphere to be cooled and returned to the tank for recooling. The expanded charges from the compressor are circulated through a coil immersed in the brine tank and back to the regenerative coil, so as to produce a gradual lowering effect on the temperature of the compressed air circulating through said coil to the expander cylinder for expansion. As in the case of compression, it is not necessary to employ vacuum insulations in order to conserve the cold produced by expansion and the problem of insulation is greatly simplified for the reason that the factor of radiation itself is utilized in the cooling of the brine or other temperature changing fluid.

The drawing shows a plan partly in section of a preferred form of apparatus for carrying out the invention.

As shown, the compressor cylinder 1 having an intake valve 2 and an exhaust valve 3, is mounted within a tank 4 adapted to be filled with brine or other fluid. A piston 5 within cylinder 1 is provided with a piston rod 6 adapted to be driven by a crank 7 on the drive shaft 8. Drive shaft 8 may be driven by any suitable source of power, although, in the present instance, it is provided with a drive wheel 9 having a driving connection, not shown, with an axle of a railway car, one of the uses of the invention being to heat railway cars in winter and cool them in summer. The exhaust valve 3 directs the compressed air or other gas from cylinder 1 into a coil 10 within tank 4. The compressed air circulates through coil 10 and out of the tank 4 through outlet 11 into the inner coil 12 of a regenerative coil. Inner coil 12 and outer coil 13 of the regenerative coil are mounted within an insulated chamber 14. The insulation for said chamber may be any ordinary insulation such as mineral wool, felt or the like.

From the inner coil 12 of the regenerative coil the compressed fluid circulates through outlet 15 and into a second tank 16 adapted to contain brine or other fluid. For this purpose the discharge end of the regenerative coil is connected with a suitable coupling 17 within said tank 16. A pipe 18 carries the compressed fluid to the valve 20 of an expansion cylinder 21. Expansion cylinder 21 is provided with a piston 22, having a piston rod 23 which may have any suitable power transmitting connection with a shaft or the like for doing external work. In the present instance piston rod 23 is connected by means of a crank 24 with drive shaft 2, thereby assisting in the operation of the compressor. The valve 20 may be operated by an eccentric 25 on shaft 2. Expanded air discharged from the compressor passes through a pipe 26 leading from the chamber of the valve 20 into a coil 27 within tank 16. Coil 27 directs the fluid to the coupling 17 from which it flows back into the outer coil 13 of the regenerative coil within chamber 14 so as to assist in the cooling of the compressed air which flows through the inner coil 12 to the expander for expansion. The expanded air in outer coil 13 is exhausted into the atmosphere through an outlet 28.

Connected with the continuation 10ª of pipe 10 is a pipe 29 which leads back to the inlet pipe 2ª of the compressor cylinder 1. Said pipe 29 is provided with a valve 30 which, upon being opened, causes the compressed air from coil 10 to flow back through pipe 29 to the inlet 2 of the compressor, wherein the compressed charge may be recompressed under certain hereinafter described conditions.

The above described apparatus provides a construction wherein either refrigerating or heating effects can be obtained, without any alteration whatsoever in the arrangement of the assembled parts of the apparatus. When it is desired to refrigerate an air atmosphere such as the interior of a railway car, the brine is run out of tank 4 and the compressed charges issuing through the outlet of the compressor cylinder 1 are cooled in coil 10 by the outside air within tank 4. The compressed charges next flow through the inner coil 12 of the regenerative coil within chamber 14 where a further cooling effect is obtained, and, flowing out of the regenerative coil, are discharged through pipe 18 and the valve 20 into the expansion cylinder 21, where they are expanded against the external resistance of the piston 22. The cold expanded air passes out of the expansion cylinder through the valve 20 and into the coil 27 which is immersed in the brine in tank 16. A heat exchange is set up between the brine in the tank and expanded air by reason of the difference in temperature between the expanded air and the brine, the air by this time having been cooled to quite a low temperature. The result of this is that heat units are radiated from the brine within the tank and absorbed by the expanded air, thereby reducing the temperature of the brine. Further expansions within the cylinder 21 reduce the temperature of the brine by successive degrees until the required degree of cold has been obtained, when the brine can be circulated by means of any circulating medium such as coils 32 through the car or other atmosphere to be cooled, and returned to the tank 16 for recooling. The discharged expanded air in outer coil 13 of the regenerator coil assists in the cooling of the compressed air in inner coil 12 before the compressed air is delivered to the expansion cylinder for expansion.

When it is desired to use the apparatus for the production of heat, the expansion cylinder may be cut off, and tank 4 is filled with brine or other suitable fluid. The compressed air from coil 10 within tank 4 may be allowed to escape into the car through an escape pipe 31 or if desired, may be circulated back through pipe 29 for recompression within the cylinder 1. The heat units radiated from the compressed air in coil 10 and absorbed by the brine in tank 4 serve to increase the temperature of the brine until the same has been heated to a sufficient degree for circulation through the car. A heating coil 33 may be utilized for circulating the hot brine through the car and the brine is returned to tank 4 for reheating. When valve 30 is opened and the compressed air is allowed to flow back to the cylinder, the compressed air mingles with the air at atmospheric pressure, flowing through the intake valve and may thus be compressed over again.

The reason for using brine, instead of placing the expander and compressor within the atmosphere to be heated or cooled, is because brine is a most excellent storing medium for heat or cold, and, when the apparatus is being used for heating or cooling railway cars, the heat or cold produced may be conserved when the car is at rest, as on a siding, for instance. The use of brine is not, however, an absolutely essential feature of the invention.

What is claimed is:

1. An apparatus of the character described, comprising, in operative relation, a gas-compressor, a cooling chamber surrounding the compressor, means for circulating the compressed gas through said cooling chamber, a gas-expander, a tank surrounding the expander, said tank adapted to contain a temperature changing fluid, a connection for directing the compressed gas from the cooling chamber to the expander, and an escape for the cooled compressed gas.

2. An apparatus of the character described, comprising, in operative relation, a gas-compressor, a cooling chamber surrounding the compressor, a coil connected with the outlet of said compressor and arranged to circulate the compressed gas through said cooling chamber, a heat insulated heat exchanger, a gas-expander, a tank surrounding the expander, said tank adapted to contain a temperature changing fluid, and means for circulating the compressed gas through the heat exchanger to the expander and for directing the expanded gas back to the heat exchanger.

3. An apparatus of the character described, comprising, in operative relation, a gas-compressor, a cooling chamber surrounding the compressor, a coil connected with the outlet of said compressor and arranged to circulate the compressed gas through said cooling chamber, a heat insulated heat exchanger, a gas-expander, a tank surrounding the expander, said tank adapted to contain a temperature changing fluid, means for circulating the compressed gas through the heat exchange to the expander and for directing the expanded gas back to the heat exchanger, and means for bringing the temperature changing fluid into heat-exchanging relation with the substance to be cooled.

4. An apparatus of the character described, comprising, in operative relation, a gas-compressor, a cooling chamber surrounding the compressor, a coil connected with the outlet of said compressor and arranged to circulate the compressed gas through said cooling chamber, a heat-insulated heat exchanger, a gas-expander, a tank surrounding the expander, said tank adapted to contain a temperature changing fluid, a coil within the tank for circulating the expanded gas from the expander through the tank, and means for circulating the compressed gas through the heat exchanger to the expander and for directing the expanded gas back to the heat exchanger.

5. An apparatus of the character described, comprising, in operative relation, a gas-compressor, a cooling chamber surrounding the compressor, a coil connected with the outlet of said compressor and arranged to circulate the compressed gas through the cooling chamber, a gas-expander, a tank surrounding the gas expander, said tank adapted to contain a temperature changing fluid, a connection for directing the compressed gas from the cooling coil within the cooling chamber to the expander, and a valve controlled connection with said cooling coil for directing the compressed gas back to the inlet of the compressor.

6. An apparatus of the character described, comprising, in operative relation, a gas compressor, a shaft for driving the compressor, a cooling chamber surrounding the compressor, means for circulating the compressed gas through said cooling chamber, a gas expander transmitting the power produced by expansion to said drive shaft to assist in driving the compressor, a tank surrounding the expander, said tank adapted to contain a temperature changing fluid, and a connection for directing the compressed gas from the cooling tank to the expander.

7. An apparatus of the character described, comprising, in operative relation, a gas compressor, a shaft for driving the compressor, a cooling chamber surrounding the compressor, means for circulating the compressed gas through said cooling chamber, a gas expander transmitting the power produced by expansion to said drive shaft to assist in driving the compressor, a tank surrounding the expander, said tank adapted to contain a temperature changing fluid, a connection for directing the compressed gas from the cooling tank to the expander, and means for bringing the temperature changing fluid into heat exchanging relation with the substance to be cooled.

ALEXANDER S. RAMAGE.